(12) United States Patent
Dobbyn et al.

(10) Patent No.: US 11,040,327 B2
(45) Date of Patent: Jun. 22, 2021

(54) BARREL REACTOR WITH ELECTRODES

(71) Applicant: University College Dublin, National University of Ireland, Dublin (IE)

(72) Inventors: Peter Dobbyn, Dublin (IE); Denis Dowling, Dublin (IE)

(73) Assignee: University College Dublin, National University of Ireland, Dublin (IE)

( * ) Notice: Subject to any disclaimer, the term of this patent is extended or adjusted under 35 U.S.C. 154(b) by 138 days.

(21) Appl. No.: 16/095,183

(22) PCT Filed: Apr. 20, 2017

(86) PCT No.: PCT/EP2017/059397
§ 371 (c)(1),
(2) Date: Oct. 19, 2018

(87) PCT Pub. No.: WO2017/182570
PCT Pub. Date: Oct. 26, 2017

(65) Prior Publication Data
US 2019/0143293 A1 May 16, 2019

(30) Foreign Application Priority Data
Apr. 21, 2016 (GB) .................................... 1606922

(51) Int. Cl.
*B01J 19/28* (2006.01)
*B01J 19/08* (2006.01)
(Continued)

(52) U.S. Cl.
CPC .............. *B01J 19/28* (2013.01); *B01J 8/10* (2013.01); *B01J 19/088* (2013.01); *B01J 19/20* (2013.01);
(Continued)

(58) Field of Classification Search
None
See application file for complete search history.

(56) References Cited

U.S. PATENT DOCUMENTS

| 4,808,286 A | 2/1989 | Angelo, II |
| 6,348,138 B1 * | 2/2002 | Yoshimura ............... C25D 7/04 |
| | | 204/212 |
| 2009/0279379 A1 * | 11/2009 | Gurney .................... B01F 9/02 |
| | | 366/92 |

FOREIGN PATENT DOCUMENTS

| JP | H06-365 A | 1/1994 |
| JP | 2005-135736 | * 5/2005 |

(Continued)

OTHER PUBLICATIONS

Arpagaus et al., "A Downer Reactor for Short-time Plasma Surface Modification of Polymer Powders", Chem. Eng. Technol. 28, No. 1, pp. 8794, 2005.*

(Continued)

*Primary Examiner* — Kishor Mayekar
(74) *Attorney, Agent, or Firm* — Merchant & Gould P.C.

(57) ABSTRACT

A barrel reactor (100) comprises a rotatable barrel (102); a first roller (110) located outside of the barrel (102) and arranged to facilitate rotation of the barrel, wherein the roller (110) comprises at least part of a first electrode; and a second electrode (120). A plasma is formed between the electrodes (110, 120). The second electrode (120) may also comprise a roller and the barrel (102) may be mounted on the rollers (110, 120). The spacing between, or positions of, the electrodes (110, 120) may be adjusted so as to accommodate different barrels (102) and/or to change the plasma distribution within the barrel (102).

20 Claims, 9 Drawing Sheets

(51) Int. Cl.
  *B01J 8/10* (2006.01)
  *B01J 19/20* (2006.01)

(52) U.S. Cl.
  CPC .. *B01J 2219/083* (2013.01); *B01J 2219/0809* (2013.01); *B01J 2219/0818* (2013.01); *B01J 2219/0852* (2013.01); *B01J 2219/0856* (2013.01); *B01J 2219/0858* (2013.01); *B01J 2219/0869* (2013.01); *B01J 2219/0879* (2013.01); *B01J 2219/0886* (2013.01)

(56) References Cited

FOREIGN PATENT DOCUMENTS

| JP | 2011-249014 A | 12/2011 |
| WO | 2010/142953 A1 | 12/2010 |

OTHER PUBLICATIONS

Int'l Search Report and Written Opinion of the Int'l Searching Authority for Int'l Pat. Appl. No. PCT/EP2017/059397 dated Jul. 7, 2017, 9 pgs.
UK Search Report for corresponding UK Pat. Appl. No. GB1606922.1 dated Nov. 11, 2016, 3 pgs.
Abourayana, H. et al., "Comparison between the Performance of Fluidized Bed and Barrel Rectors for the Plasma Activation of Polymer Particles", J. Mineral Metal Mat. Eng., 1: 57-64 (2015).
Abourayana, H. et al., "Investigation of a scalable barrel atmospheric plasma reactor for the treatment of polymer particles", Surface & Coatings Tech., 308: 435-441 (2016).
Donegan, M. et al., "Activation of PET Using an RF Atmospheric Plasma System", Plasma Chem Plasma Process, 33: 941-957 (2013).
Milosavljevic, V. et al., "Diagnostics of an O2-He RF Atmospheric Plasma Discharge by Spectral Emission", J. of the Physical Soc. of Japan, 83: 8 pgs (2014).
Nwankire, C. et al., "Electrical, Thermal and Optical Diagnostics of an Atmospheric Plasma Jet System", Plasma Chem and Plasma Processing, 30(5): 537-552 (2010).

\* cited by examiner

BARREL REACTOR WITH ELECTRODES

This application is a National Stage Application of PCT/EP2017/059397, filed 20 Apr. 2017, which claims benefit of Serial No. 1606922.1, filed 21 Apr. 2016 in the United Kingdom, and which applications are incorporated herein by reference. To the extent appropriate, a claim of priority is made to each of the above-disclosed applications.

BACKGROUND OF THE INVENTION

The invention relates to barrel reactors. Barrel reactors comprise a rotatable barrel and may comprise a pair of electrodes. The electrodes can be used to create an electromagnetic field within the barrel, which may be sufficient to convert a gas or other medium within the barrel into plasma.

The invention is described herein in relation to plasma coating and surface activation using plasma. In a barrel reactor, particles and/or objects to be plasma-treated are agitated in the plasma discharge by the barrel's rotation.

Examples of technology areas to which the invention can be applied include:
- Plasma activation of polymer and metal particles prior to three dimensional (3D) printing;
- Activation and/or cleaning of pharmaceutical powders prior to chemical reactions;
- Treatment of powders prior to coating, such as preparation of specialist food ingredients with protective anti-oxidative coatings;
- Activation of filtration powders;
- Mixing of powder and non-conductive liquids; and
- Deposition of coatings by plasma polymerisation—nm thick coatings can be deposited with tailored surface chemistries/surface energies for applications such as cell support in bioreactors.

However, the skilled person would understand that the invention's utility is not limited to these purposes.

Polymer powders often require pre-treatment prior to their use in additive manufacture, as paint fillers, in biotechnology (cell supports) and as composite filler materials. Polymers, however, are characterized by exhibiting low surface energy and hydrophobic properties. Plasma treatments have been extensively applied as a means of enhancing polymer surface energy, through the introduction of polar groups and cross-linking on the surface, without changing the bulk composition. These treatments are dry, clean, rapid and environment-friendly. Plasmas also have the advantage of a very low specific consumption of chemicals and energy. Both low pressure and atmospheric pressure discharges have been applied for these treatments. Compared with low pressure sources, the advantages of an atmospheric pressure glow discharge include the elimination of the requirement for vacuum equipment, thus achieving reduced processing costs. The industrial applications of plasma processing have however to date, largely focused on flat polymer substrates.

Compared with flat surfaces, the treatment of polymer powders can give rise to handling issues associated with particle aggregation, with variations in the size of particle to be treated, as well as long treatment times due to their large surface area per unit mass. This is reflected in the relatively few reports on the use of atmospheric pressure discharges for the activation of polymer powders in the literature. Amongst other plasma reactor designs, plasma-fluidized bed reactors, plasma downer reactors and plasma batch reactors have been used. Of these, the most widely applied has been the fluidized bed system; however this system can have difficulties where there are a range of particle sizes being treated due at least in part to the difficulty in keeping larger particles suspended, while preventing loss of smaller particles.

SUMMARY OF THE INVENTION

According to a first aspect of the invention, there is provided a barrel reactor comprising:
- a rotatable barrel; and
- a first roller located outside of the barrel and arranged to facilitate rotation of the barrel, wherein the roller comprises at least part of a first electrode.

The barrel reactor may further comprise a second electrode.

The barrel may be mounted on the first roller.

The second electrode may comprise or constitute a second roller. Alternatively or additionally, one or more rollers which are not electrodes or parts of electrodes may be provided. The barrel may be mounted on two or more of the rollers.

The first roller, the second roller, or both may be rotated by the barrel; or arranged to cause rotation of the barrel, i.e. one or more of the rollers may be driven; non-driven rollers may be freely rotating. At least one of the electrodes may consist of one or more rollers.

In embodiments with multiple rollers, one or more rollers may be located within the barrel, and optionally in such cases a roller within the barrel may form the axle of the barrel. Alternatively or additionally, the, each, or at least one roller in addition to the first roller may be located outside of the barrel.

The barrel reactor may further comprise a rod or other structure which is not a roller within or outside the barrel, wherein the rod or other structure forms at least part of the second electrode. The rod or other structure may not rotate, for example being fixed with respect to a base of the reactor. The reactor may therefore comprise a non-rotating second electrode, which may be located within the barrel or outside the barrel.

The, each, or at least one roller may be arranged at least substantially parallel to the barrel.

The barrel has a barrel wall; the, each or at least one roller may be in contact with the barrel wall. In such examples, the, each or at least one roller may be arranged to cause rotation of the barrel using the contact between the barrel wall and the roller.

Where one or more rollers are used to rotate the barrel, an outer surface of the barrel wall and/or a surface of the one or more rollers may be textured so as to provide grip between the barrel wall and the one or more rollers. Additionally or alternatively, the barrel and/or one of more of the rollers may be provided with one or more O-rings arranged to provide grip between the barrel wall and the one or more rollers.

An electromagnetic field may be generated between the first and second electrodes. When the barrel rotates, the barrel wall may be arranged to move through regions of the electromagnetic field of different strengths.

The first and second electrodes may be arranged such that an electromagnetic field generated by the electrodes is not evenly distributed across the barrel.

The one or more rollers may be located in a lower portion of the barrel reactor, such that, for example, the one or more rollers are located at or below the horizontal plane bisecting the barrel.

All of the rollers may be located within a predetermined angular spacing of the lowest point of the barrel wall, the angular spacing being measured around the barrel's circumference.

The first and second electrodes may be arranged, in use, to generate an electro-magnetic field within at least a part of the barrel. Optionally, the electromagnetic field may be arranged to generate plasma within at least a part of the barrel. The first and second electrodes may be arranged, in use, to generate an inhomogeneous electromagnetic field within at least a part of the barrel. The inhomogeneous electromagnetic field may be only sufficient to generate plasma in a portion of the barrel. The inhomogeneous electromagnetic field may be only sufficient to generate plasma in a lower portion of the barrel.

One or more of the one or more rollers may be arranged such that they can be moved or vibrated longitudinally, which may aid mixing of the barrel contents.

The barrel reactor may further comprise a support arranged to receive one or more of the one or more rollers and/or a drive system arranged to rotate either the barrel or one or more of the one or more rollers.

In embodiments with a drive system (e.g. a motor) a drive system controller may be provided. The drive system controller may control the speed and rotation direction of the or each roller arranged to be rotated by the drive system, and/or of the barrel. The drive system controller may be arranged, in use, to move the first roller closer to the second electrode to facilitate reaching strike-point within the barrel reactor when the reactor is first activated, before returning the first roller to an operating position.

The barrel reactor may further comprise an inlet arranged to allow material (e.g. a polymer powder to be treated) to enter the barrel reactor. The inlet may be positioned in a portion of the barrel that is arranged not to contain plasma (e.g. where no electromagnetic field is present, or where the field is too weak to support a plasma).

The barrel is made of or comprises a dielectric material. The barrel may be made of any dielectric material, for example glass, quartz or a dielectric polymer. The first and second electrodes may be arranged so as to allow at least a portion of the dielectric material to relax as the barrel rotates.

According to a second aspect of the invention, there is provided a kit of parts for a barrel reactor. The kit comprises:
one or more rotatable barrels; and
a barrel reactor as described with respect to the first aspect of the invention.

The kit may further comprise a support arranged to receive one or more of the rollers. The support may be arranged to allow the height and/or separation of the one or more rollers supported thereby to be modified to accommodate a selected barrel of the one or more barrels and/or to facilitate reaching strike-point within the selected barrel.

Features described in relation to one of the above aspects of the invention may be applied, mutatis mutandis, to the other aspect of the invention. Further, the features described may be applied to the or each aspect in any combination.

BRIEF DESCRIPTION OF THE DRAWINGS

There now follows, by way of example only, a detailed description of embodiments of the present invention with reference to the accompanying drawings in which:

FIG. 1b shows a schematic side elevation view of the barrel reactor of FIG. 1a;

DETAILED DESCRIPTION OF THE PREFERRED EMBODIMENT

Figure 1A:
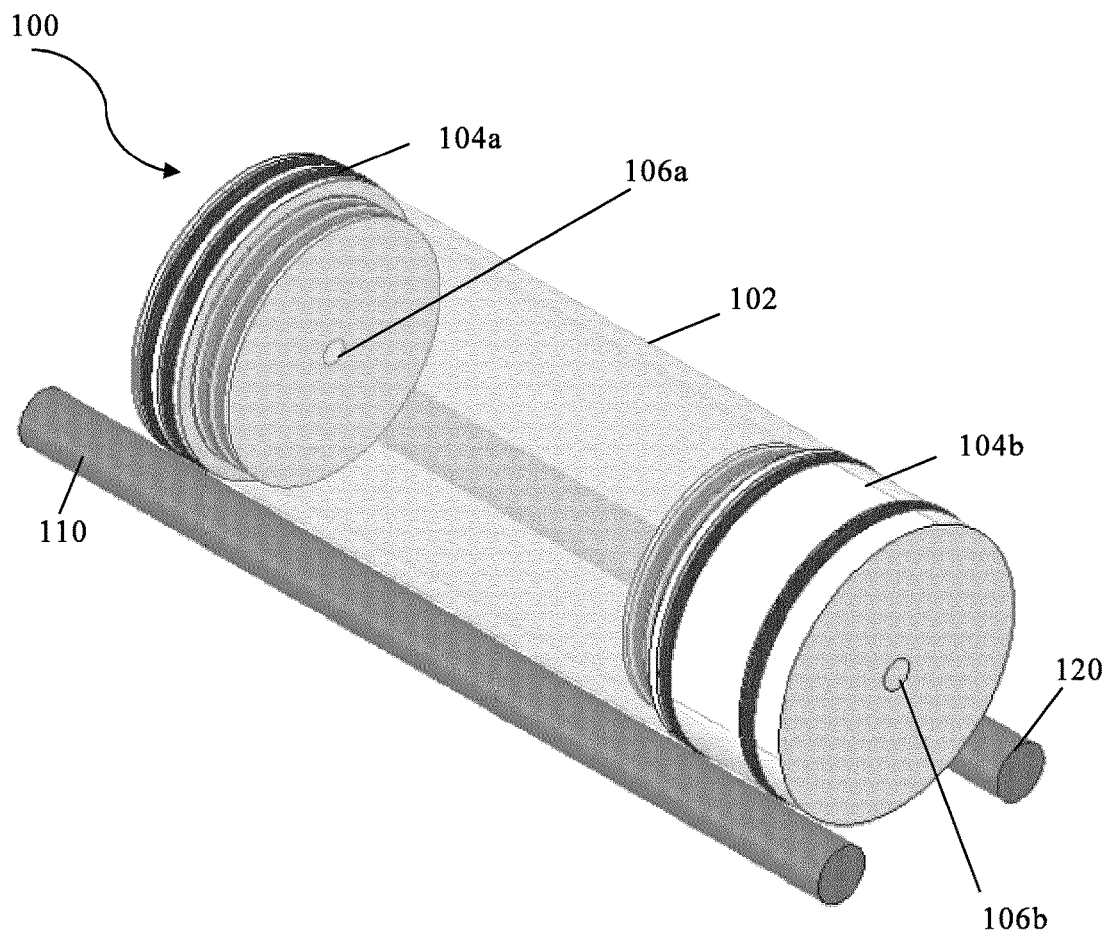
FIG. 1a shows a schematic perspective view of a barrel reactor of an embodiment.

In the figures, like reference numerals are used to reference like components, with 100, 200 and 300 being barrel reactors of different embodiments, for example, and 110, 210 and 310 being the first electrode of each corresponding barrel reactor 100, 200, 300.

Figure 1B:
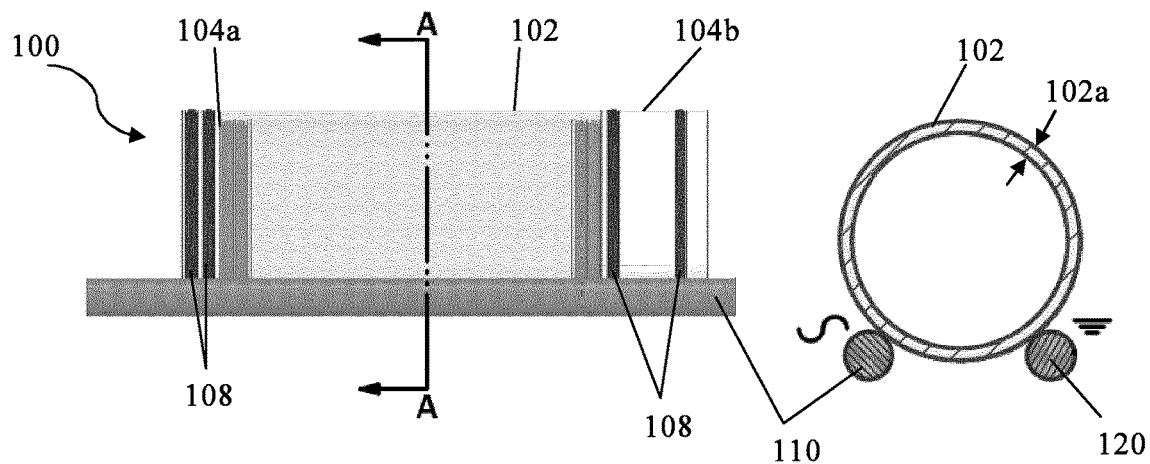
Figure 1C:
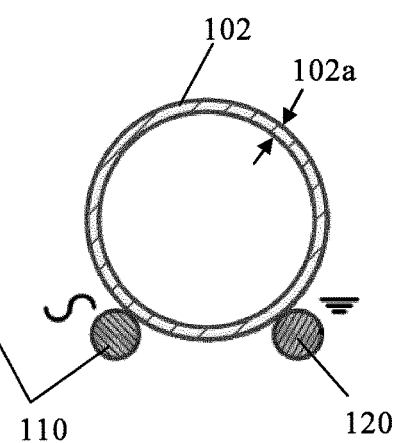
FIG. 1c shows a schematic cross-section of the barrel reactor of FIGS. 1a and 1b along line A-A.

As shown in FIGS. 1a-c, the barrel reactor 100 according to a first embodiment of the invention comprises a rotatable barrel 102. In the embodiments described herein, the barrels 102 are substantially cylindrical. The skilled person would understand that alternative shapes could be used, for example conical, cubic or cuboid barrels, or barrels with polygonal cross-sections with, for example, 3, 5, 7, 8, 9 or 10 sides. Barrel shapes may be regular or irregular, angular and/or curved. The skilled person would understand that barrels 102 with corners may provide a more bumpy rotating motion, which may aid mixing of the contents of the barrel chamber.

The rotatable barrel 102 comprises a barrel wall 102a. The barrel wall 102a forms the boundary of the reactor chamber (i.e. the interior of the barrel 102), and may also be described as a chamber wall 102a. In the embodiments being described, the barrel wall 102a comprises a dielectric material such as quartz. The skilled person would understand that other dielectric materials such as glass, mica, porcelain and some plastics such as polyvinyl chloride may also be used, in addition to or instead of quartz.

In the embodiment being described, the barrel wall 102a is entirely made of a dielectric material. In alternative embodiments, one or more portions of the barrel wall may be made of a material which is not a dielectric material. For example, in some embodiments, the central 10 cm of a barrel wall 102a of length 15 cm may be made of a dielectric polymer and the outer 2.5 cm at each end may be made of a non-conducting, non-dielectric polymer. The skilled person would understand that any portion of the barrel wall 102a which is near to or in contact with an electrode 110, 120 should not be made of a conducting material so as to avoid or minimise the risk of short circuiting.

Advantageously, the dielectric material is transparent, so enabling a user to view the inside of the barrel 102 during use. In other embodiments, the barrel wall 102a is not transparent, and may instead be translucent or opaque. Further, in some embodiments, a barrel wall which is generally not transparent may be provided with a transparent window therethrough.

The skilled person would understand that the thickness of the barrel wall 102a may be varied depending on wall material, barrel size, barrel shape, field requirements, desired rotation speed, desired barrel strength, and the nature of the materials to be introduced into the barrel reactor 100, amongst other variables.

In the embodiment being described with respect to FIG. 1, the barrel reactor 100 comprises two bungs 104a, 104b, each of which seals one end of the barrel 102. The skilled person would understand that other end caps or seals may be used in place of the bungs 104a, 104b. Alternatively, in some embodiments, no bungs 104a, 104b or equivalent may be provided—reactants and/or material to be treated may instead flow freely into and out of the barrel 102 through open ends thereof.

In the embodiment being described, the bungs 104a, 104b comprise an inlet 106a and an outlet 106b respectively, through which fluid may enter and leave the barrel 102. In alternative embodiments, the inlet 106a and outlet 106b may be provided in the same bung 104a, 104b. In alternative embodiments, the barrel reactor 100 may be sealed and an inlet 106a and outlet 106b may not be provided, and/or may be sealed in use. Advantageously, use of a sealed barrel reactor 100 may reduce consumption of the gas used to form the plasma. In embodiments wherein the barrel 102 is sealed, the chamber 102 may be flushed with He or a He/$O_2$ gas mixture prior to igniting the plasma therein.

A sealed barrel reactor 100 forms a closed system—gas flow is reduced to zero. The skilled person would understand that this may be particularly advantageous when treating relatively large parts, such as medical devices, for which a relatively large volume of plasma is needed, or in applications where a relatively large processing time is required.

A barrel reactor 100 with an inlet 104a and outlet 104b may be used as part of an in-line system. In addition to, or instead of, introducing the gas used to form the plasma through the inlet 104a, an atomised or vaporised material to be used in coating or otherwise treating particles or objects within the barrel 102, 202, 302 may also be introduced through the inlet 104a. In some embodiments, the objects/particles to be coated may also be moved in through the inlet 104a and out through the outlet 104b.

In alternative or additional embodiments, multiple inlets 104a and/or outlets 104b may be present, and may be separately openable and closable.

A roller 110, 120 is an object that rotates about its central axis; rollers 110, 120 are generally at least substantially cylindrical.

In the embodiment shown in FIG. 1, the barrel 102 rests on two rollers 110, 120.

In this embodiment, the barrel 102 is supported by the two rollers 110, 120, and so can be described as being mounted on the rollers 110, 120.

The skilled person would understand that, in alternative or additional embodiments, a different number of rollers may be used, for example 1, 3, 4, 5, 6, 8 or 10 rollers, and that the rollers may be arranged symmetrically or asymmetrically around the barrel 102. In at least some embodiments, a maximum of six rollers may be used.

In this embodiment, both rollers 110, 120 are driven to rotate, so causing the barrel 102 to rotate. A motor may be used to drive the rollers 110, 120. In alternative embodiments, one or more rollers may not be driven, and may instead be freely rotating.

In the embodiments being described, the one or more rollers 110, 120 are in contact with the barrel wall 102a and arranged to cause rotation of the barrel 100 using the contact between the barrel wall 102a and the one or more rollers 110, 120. Advantageously, the use of rollers 110, 120 to directly impart rotation to the barrel 102 reduces the number of system components required, so simplifying the barrel reactor 100. Further, use of the rollers 110, 120 to drive the barrel 102 may facilitate the exchange of barrels 102—in many roller configurations, one barrel 102 may simply be lifted off the rollers 110, 120 and another barrel placed on the rollers in its stead.

In the embodiment being described, the rollers 110, 120 are located outside the barrel 102. In alternative embodiments, one, some or all rollers 110, 120 may be located inside the barrel 102.

In the embodiment being described the rollers 110, 120 are in contact with, or at, the barrel wall 102a. In alternative or additional embodiments, one or more rollers 110, 120 may be located near the barrel wall 102a. Advantageously, rollers 110, 120 located outside of the barrel 102 and which also function as electrodes are located at or near the barrel wall 102a so as to reduce undesired ozone generation between the electrode rollers 110, 120 and the dielectric barrel 102. The skilled person would understand that embodiments in which the electrode rollers 110, 120 are in contact with the barrel wall 102a may benefit most from reduced ozone generation.

In alternative embodiments, only one of the rollers 110, 120 may be driven by the motor, and the other roller 120, 110 may be caused to rotate by the rotating barrel 102. In alternative or additional embodiments, the driving force for rotation of the barrel 102 may be supplied by other means instead of, or in addition to, one or more driven rollers. For example, a suction cup may be attached to a bung 104a, 104b or other end cap of the barrel 102 and rotated, and/or a driven wheel or belt may be provided in contact with the outer surface of the barrel 102. The skilled person would understand that many other possible drive arrangements may be used without departing from the scope of the invention.

Advantageously, using one or more of the rollers 110, 120 to drive rotation of the barrel may simplify the barrel reactor 100 system by reducing the number of components required and/or increasing ease of construction and adjustment of the system, for example ease of replacing one barrel 102 with another.

In this embodiment, the bungs 104a, 104b are arranged to stop or reduce slippage of the barrel 102 on the rollers 110, 120. The weight of the bungs 104a, 104b may help to increase friction between the barrel 102 and the rollers 110, 120. Additionally or alternatively, the bungs 104a, 104b may be provided with O-rings 108 made of rubber or similar, and/or may have a textured surface, so as to increase the friction. The skilled person would understand that, additionally or alternatively, O-rings, a textured surface and/or the like could be provided on one or more of the one or more rollers 110, 120.

In additional or alternative embodiments, other means of reducing slippage may be used; for example, a spring or sprung wheel or sprung roller, may be used to both drive rotation of the barrel 102 and to keep the barrel 102 in close contact with the rollers 110, 120. The sprung roller or sprung wheel or spring may be located such that it urges the barrel 102 towards the rollers 110, 120; e.g. the sprung roller or sprung wheel may be located at or near the top of the barrel 102. In some embodiments, the weight of the barrel 102 itself may be sufficient without further grip assistance, and/or the surface of the barrel 102 may be textured.

In this embodiment, the barrel reactor 100 has two electrodes; a first electrode 110 and a second electrode 120. In this embodiment, the rollers 110, 120 constitute the first 110 and second 120 electrodes respectively. These may be referred to as roller electrodes 110, 120.

In this embodiment, the electrodes 110, 120 are made of metal, and more preferably of aluminium or steel. The skilled person would understand that other conductive materials can be used. In alternative or additional embodiments, one or both of the roller electrodes 110, 120 have a dielectric outer coating or sleeve. In such embodiments, an area of the or each coated roller electrode 110, 120 may be uncovered by the dielectric so that the electrical connection can be made. For example, one end of each roller electrode 110, 120 may be exposed, and/or a gap or hole may be provided through the dielectric coating.

In embodiments with more than two rollers 110, 120, one or both electrodes 110, 120 may comprise more than one roller 110, 120. Additionally or alternatively, one or more rollers which do not function as electrodes may also be provided, and/or barrel reactor components which are not rollers may form all or part of one or both electrodes 110, 120. Rollers which do not function as electrodes may be made of an electrically insulating material, for example plastics such as Polytetrafluoroethylene (PTFE). Dielectric materials may also be used for rollers which do not function as electrodes.

In the embodiment shown in FIG. 1c, the first electrode 110 is biased and the second electrode 120 is earthed. The skilled person would understand that this could be reversed, and/or that the bias of each electrode 110, 120 may be controlled and/or set to a specific value. In this way, voltage, or potential difference, between the two electrodes 110, 120 is set or controlled. The skilled person would understand that the voltage chosen depends upon various factors including the power supply and transformer, barrel size and material, electrode spacing and the gas used to form the plasma. Further, the voltage may be temporarily increased to form the plasma—i.e. for plasma strike. Additionally or alternatively, the electrodes may be moved closer together to initiate plasma formation. The skilled person would understand that various factors affect field intensity, as outlined above, and that modification of one or more of these factors can be used to facilitate strike.

The skilled person would understand that the maximum voltage to be selected depends on the size of the barrel 102 being treated. In general, voltages of around 2 kV to around 25 kV may be used to generate the plasma. The input voltage used to generate these voltages may depend on the choice of power supply. As would be understood by the skilled person, higher voltages may be needed to form a plasma from other gases such as nitrogen.

The skilled person would understand that the coupling frequency may have an effect on plasma generation and/or properties and may be substrate specific. Use of a variable frequency power supply may therefore be particularly advantageous.

The roller electrodes 110, 120 are arranged at or near the barrel wall 102. In this embodiment, the first and second electrodes 110, 120 are arranged to be in contact with the outer surface of the barrel 102. Advantageously, the direct contact between the electrodes 110, 120 and the barrel wall 102a reduces or eliminates ozone generation around the electrodes.

In alternative embodiments, the electrodes 110, 120 are not in contact with the barrel wall 102a, but are near the barrel wall 120a; for example, a cog, O-ring, gear system or the like may be provided between the electrodes 110, 120 and the barrel wall 102a.

Figure 2:
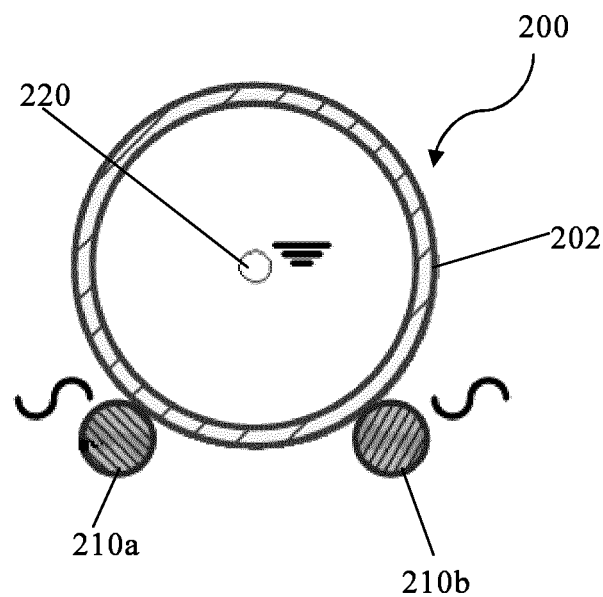
FIG. 2 shows a cross-sectional view of a barrel reactor of an embodiment with a different electrode configuration.

FIG. 2 shows a barrel reactor 200 having an axle 220 which comprises the second electrode 220. The barrel reactor 200 of this embodiment again has two rollers 210a, 210b; these both form part of the first electrode 210. In alternative or additional embodiments, the second electrode 220 may comprise one or more rollers and/or other components in addition to the axle 220.

As the barrel reactor 200 has an axle 220, the axle 220 may be driven so as to cause rotation of the barrel 202. The axle 220 may also be non-driven, for example being freely rotating. Alternatively or additionally, one or both of the rollers 210a, 210b may be driven, or a separate drive means may be used as described with respect to FIG. 1.

In additional or alternative embodiments, one or more rods or plates may be provided within the barrel 102, 202 and form part of the first electrode 110, 210, and/or form part of, or all of, the second electrode 120, 220. The one or more plates and/or rods may be arranged centrally within the barrel 102, 202, and/or may be substantially parallel to or perpendicular to the barrel's circumference, or inclined at any angle in between. The skilled person would understand that many different configurations would be possible.

Figures 3A, 3B:
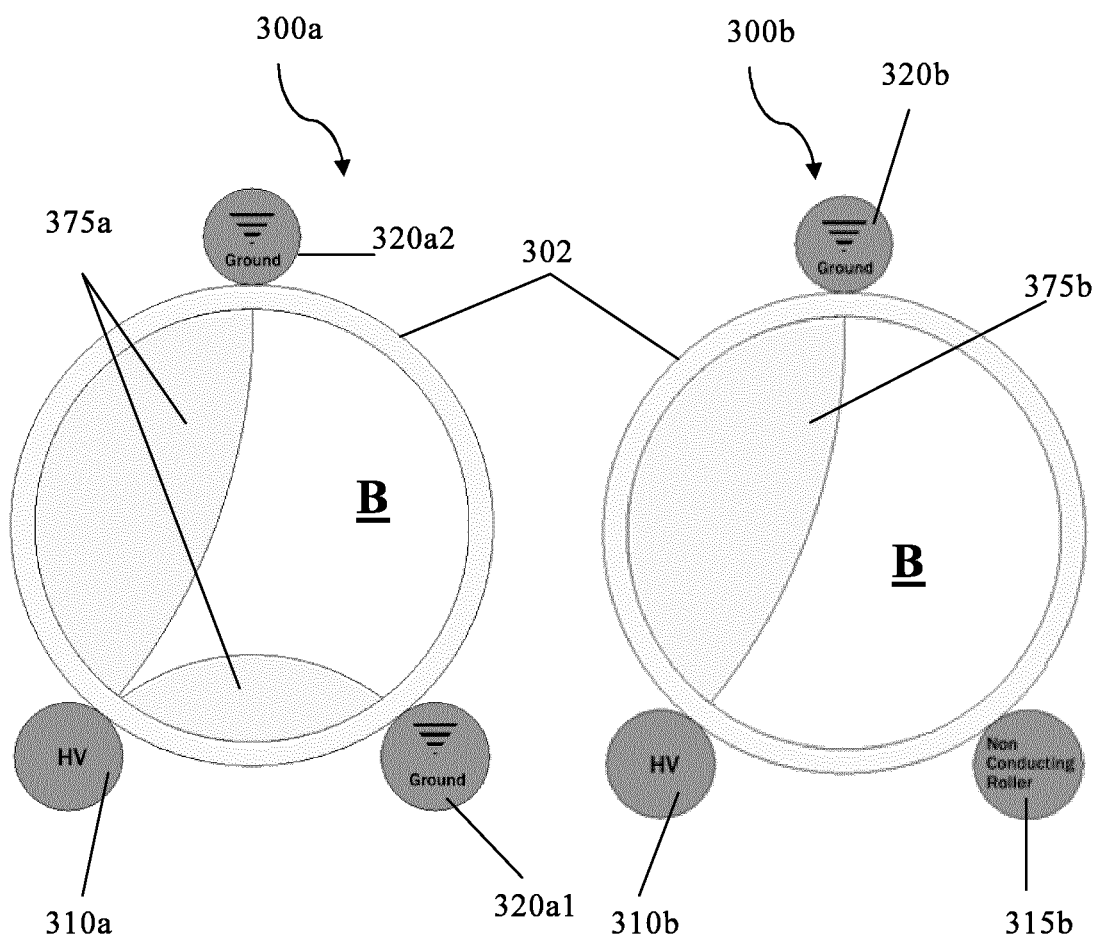
FIGS. 3a and 3b show barrel reactors of two embodiments with the same roller configuration but two different electrode configurations, also showing the corresponding field lines.

FIGS. 3a and 3b show a barrel reactor 300 with a larger number of rollers—in particular, three rollers.

In FIG. 3a, all three rollers 310a, 320a1, 320a2 are electrodes. The electromagnetic field is marked by the shaded region 375a.

In FIG. 3b, two of the three rollers 310b, 320b are electrodes and the third roller 315b is not an electrode. In this embodiment, the third roller 315b is made of a non-conducting material. The electromagnetic field is marked by the shaded region 375b.

The skilled person would understand that many different field distributions may therefore be obtained even with the same roller arrangement.

In the embodiment shown in FIG. 3b, the barrel 302 is supported by two rollers—the first electrode 310 and the non-electrode roller 315. The second electrode 320 (which may or may not be one or more rollers in various embodiments) can then be placed wherever the operator wants in order to achieve a desired field, without moving the barrel 302.

The skilled person would understand that all of the options and examples discussed above with respect to the embodiment on FIG. 1 can also be applied to the other embodiments described herein.

In the embodiments being described, the electrodes 110, 120, 210, 220, 310, 320 are arranged to produce an electromagnetic field within a portion of the barrel 102, 202, 302. In additional or alternative embodiments, the electrodes 110, 120, 210, 220, 310, 320 may be arranged to produce an electromagnetic field throughout the barrel 102, 202, 302.

Figure 5:
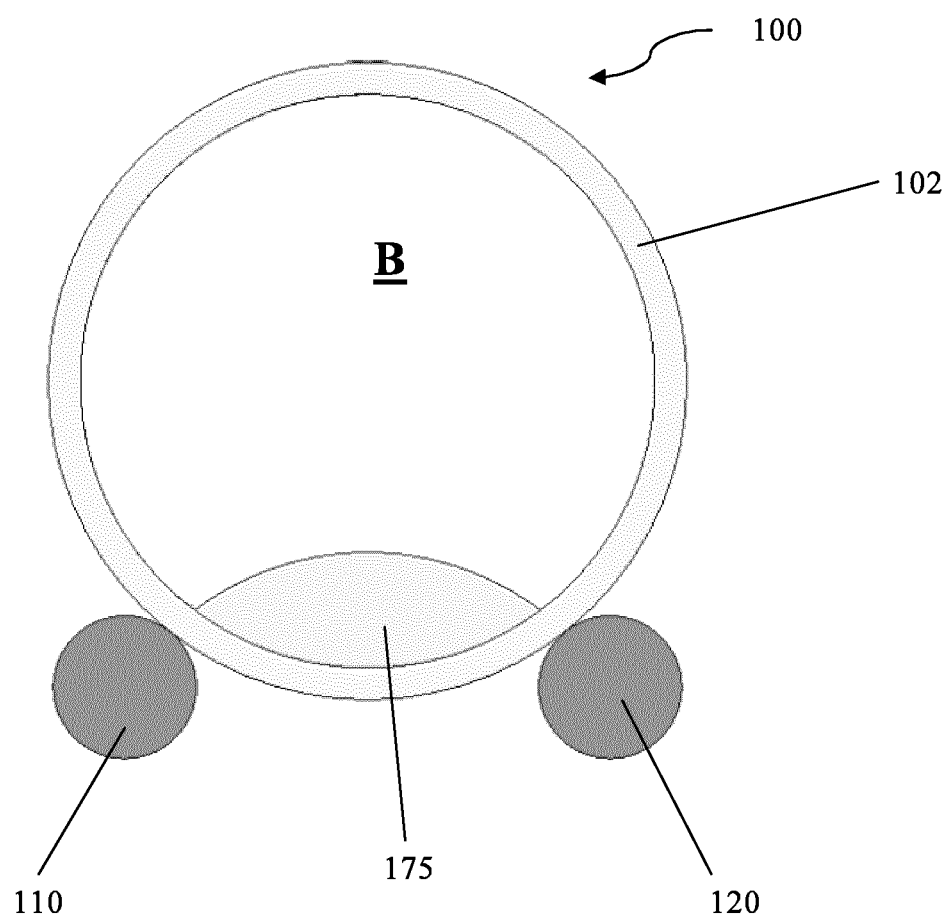
FIG. 5 shows a schematic view of field lines within the barrel reactor with the electrode configuration shown in FIG. 1.

Examples of field lines of the electromagnetic field generated by the electrodes 110, 120, 310, 320 are shown in FIGS. 3a, 3b and 5. For a single pair of roller electrodes 110, 120, the field lines curve between the electrodes (FIG. 5 and FIG. 3b). With multiple alternating electrodes, as shown in FIG. 3a, the field lines take "gull wing" shapes between the oppositely charged electrodes. In both cases, the field strength varies around the barrel 102, 302 and areas of the barrel 102, 302 (marked B) have substantially zero field.

Advantageously, the field is arranged such that when the barrel 102, 202, 302 rotates, the barrel wall 102a is arranged to move through regions of different electromagnetic field (e.g. stronger and weaker, and/or of a different direction). The skilled person would understand that this may include one or more regions with zero electric field. The electromagnetic field may be constant with time, or may vary in strength and/or direction over time. The electromagnetic field, whether or not it is constant with time, may vary across or within the barrel 102 such that different portions of the barrel 102 experience a different field at the same time. As such, the electromagnetic field may be non-uniform across the barrel—the electromagnetic field may be non-uniform from the perspective of the moving dielectric, i.e. as experienced by a specific/fixed portion/point of the dielectric as it moves through the substantially static/changing field.

In the embodiment being described, at least a portion of the barrel is substantially outside the field at any time The portion of the barrel 102 that is outside the field varies as the barrel 102 rotates. The portion of the barrel 102 which relaxes may be described as a changing portion, as the portion size and shape may vary as the barrel 102 moves and/or as the field itself varies with time. Advantageously, this change in electromagnetic field experienced by the barrel wall 102a as it moves allows the dielectric material of the barrel wall 102a to relax during use, so increasing the longevity of the material, for example by avoiding overheating.

Due to gravity acting on the treated particles 740, a barrel reactor 100, 700 in which the plasma is concentrated towards the bottom half of the barrel 102 may be advantageous in many embodiments.

In the embodiments being described, the electrodes 110, 120, 210, 220, 310, 320 are therefore preferably arranged to produce an electromagnetic field which varies in different portions of the barrel 102, 202, 302, and/or which is zero in at least one portion of the barrel 102, 202, 302, or at least sufficiently low to allow the dielectric to relax. The skilled person would understand that, as the barrel 102, 202, 302 rotates, the field strength experienced by the material of the barrel wall 102a therefore varies.

In the embodiments being described, the electrodes 110, 120, 210, 220, 310, 320 are not evenly distributed around the circumference of the barrel 102, 202, 302. In embodiments wherein not all rollers are electrodes, rollers may be evenly distributed around the barrel whilst keeping an uneven distribution of electrodes 110, 120, 210, 220, 310, 320. In alternative embodiments, rollers may be unevenly distributed. Herein, "uneven" with respect to electrode distribution is used to mean arranged to create an electromagnetic field which varies in strength, i.e. which is not even, across the whole of the barrel 100, 200, 300. For example, spacings between adjacent electrode rollers may be substantially or exactly equal around an arc of the circumference of the barrel 102, 202, 302, but the remainder of the circumference may have no electrode rollers.

In the embodiments shown in FIGS. 1 and 2 and the likes, the one or more roller electrodes 110, 120, 210 are located in a lower portion of the barrel reactor 100, 200, such that the one or more roller electrodes 110, 120, 210 are located at or below a horizontal plane bisecting the barrel 100, 200. In this way, the roller electrodes 110, 120, 210 can be arranged to:

support the barrel 102, 202;
either cause rotation of the barrel 100, 200 or be rotated by it; and
create an electromagnetic field in only a lower portion of the barrel 102, 202, so that:
the dielectric material of whichever portion of the barrel 102, 202 is uppermost during rotation can relax; and
material to be treated falls to the bottom of the barrel 102 due to gravity, and therefore is within the electromagnetic field or plasma region.

The skilled person would understand that the one or more roller electrodes 110, 120, 210 could instead be positioned in an upper portion of the barrel reactor 100, 200, and/or split between the upper and lower portions thereof. The skilled person would understand that an additional support for the barrel 102, 202 may be needed in some arrangements—for example a supported axle, one or more non-electrode rollers below the barrel and/or a rotating belt secured around the barrel 102, 202, 302.

The first and second electrodes 110, 120, 210, 220, 310, 320 are therefore arranged, in use, to generate an electromagnetic field within at least a first part of the barrel 100, 200, 300. The electromagnetic field may be arranged to generate plasma within at least a second part of the barrel 100, 200, 300. The first and second parts of the barrel 100, 200, 300 may be identical (i.e. plasma is generated everywhere within the barrel where a field is present), similar (e.g. plasma is generated in most areas of the chamber in which a field is present) or overlapping (e.g. plasma is generated in a subset of the region within the barrel where a field is present).

Advantageously, in embodiments with an inlet 106a arranged to allow material to enter the barrel reactor 100, the inlet 106a is positioned in a portion of the barrel 102 that is arranged not to contain plasma.

The skilled person would understand that, particularly in the case of an inlet arrangement involving liquid nebulisation using high pressure at a nozzle tip, the presence of plasma could cause deleterious blocking of the inlet 106a, and that placing the inlet 106a such that it is not within the plasma reduces the chance of such blockages. In some embodiments, the nozzle may therefore be positioned to be outside of the electromagnetic field generated between the electrodes 110, 120. In alternative embodiments, the nozzle may be positioned within the electromagnetic field, but in a region wherein the field is not sufficiently strong for plasma to be present.

The skilled person will appreciate that the use of one or more rollers 110 outside of the barrel 102 as the first electrode 110 allows the plasma distribution within the barrel to be more easily configured than in prior art reactors. Moving the roller 110 and/or adding one or more additional rollers changes the field distribution within the barrel 102. The field within the barrel 102 is easily adjustable—it is not merely either on or off.

As an example of the advantageous uneven distribution of electrodes 110, 120 around the barrel 102, all of the roller electrodes may be within a predetermined angular spacing of all other rollers, and/or within a predetermined angular spacing of the lowest or highest point of the barrel wall 102a, for example 30°, 45°, 60°, 180°, 120° or 100°, the angle being measured around the barrel's circumference. The predetermined angular spacing may be determined based upon barrel circumference, desired field strength/intensity, desired or available power and voltage ranges for the electrodes, and the type of particle or object to be treated.

For example, all of the roller electrodes 110, 120, 210 may be within 60° of the lowest point of the barrel 100, 200, 300, the 60° angle being measured around the barrel's circumference.

In addition, a vertical offset between the roller electrodes 110, 120 may be adjustable so as to alter the shape of an electrical field generated therebetween within the barrel.

The skilled person would understand that the distribution of electrodes may be symmetrical, for example having mirror symmetry such as the cross-sections shown in FIG. 1c and FIG. 2, whilst still being uneven in terms of the field generated with respect to the barrel 100, 200, 300.

In the embodiments described above, the rollers 110, 120, 210 are substantially parallel to the barrel 100, 200 and extend the full length of the barrel 102, 202. In alternative or additional embodiments, the rollers 110, 120, 210 may be shorter than the barrel 102, 202; in such embodiments wherein the rollers are electrodes 110, 120, the electromagnetic field generated may therefore only occupy a longitudinal portion of the barrel 102, 202, with an area near at least one end of the barrel being outside any generated field. In alternative embodiments, the rollers may be longer than the barrel 102, 202, 302—in such embodiments multiple barrels may be placed on the same rollers and rotated together.

In any of the embodiments described, the one or more rollers 110, 120, 210 may be arranged such that they can be moved or vibrated longitudinally. Advantageously, this may provide a supplementary mixing effect to the barrel's contents 740.

Figure 4A:
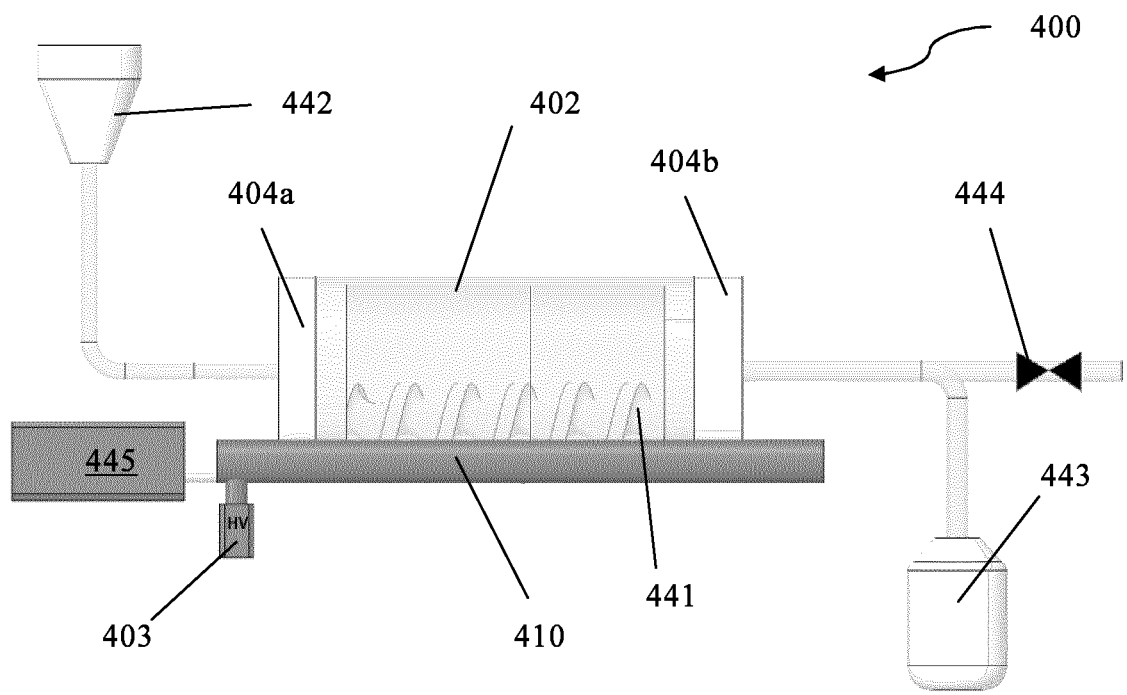
FIGS. 4a and 4b show two schematic views of a barrel reactor of an embodiment in which an Auger screw is used to move powder to be treated through a barrel reactor.
Figure 4B:
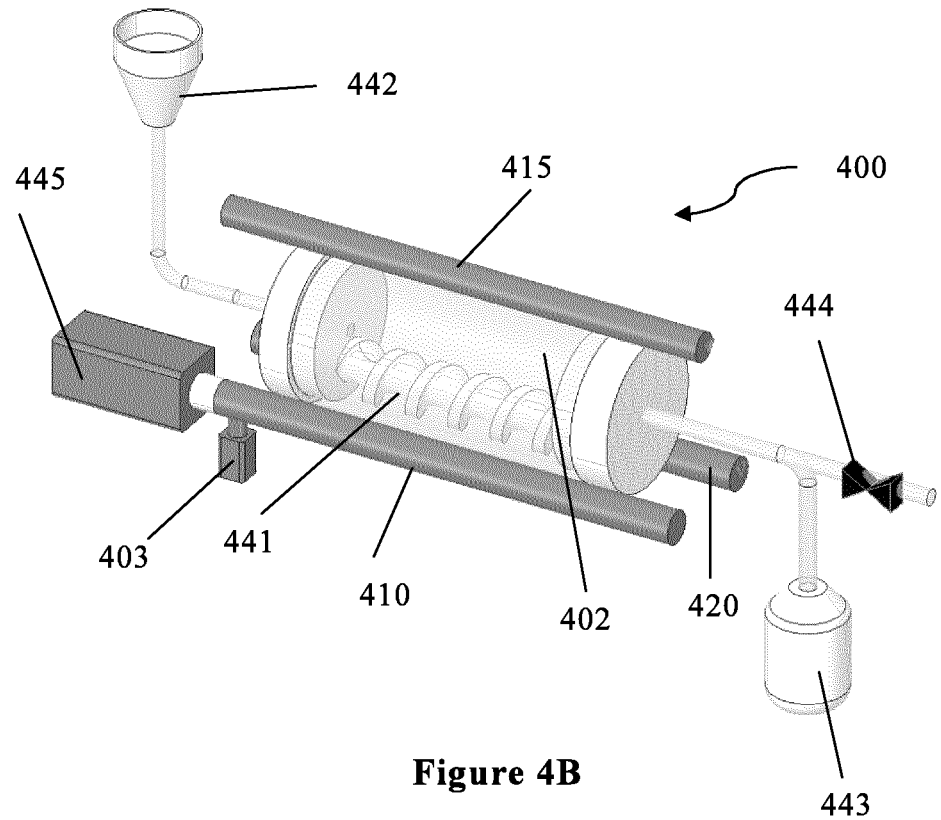

In the embodiments shown in FIGS. 4a and 4b, an Auger screw 441 is provided within the barrel 402. The barrel reactor 400 further comprises a powder hopper 442 in which powder 740 to be treated is stored prior to treatment. The powder 740 is introduced to the barrel 402 and moved through the barrel 402 by the Auger screw 441. The skilled person would understand that use of an Auger screw may advantageously improve mixing.

After treatment, the powder 740 leaves the barrel and is stored in a container 443.

In the embodiment being described, valve 444, which may be a gate valve, is used to control gas flow through the barrel. In the embodiment being described, the treated powder 740 is separated from the gas under the influence of gravity. In alternative or additional embodiments, a filter or other separation means may be used.

The barrel reactor 400 of the embodiments being described further comprises a motor gearbox 445 arranged to control rotation of the electrode rollers 410, 420. In the embodiment shown in FIG. 4b, a third roller 415 is provided which does not function as an electrode. This roller may be driven or freely rotating. In addition, a high voltage probe 403 is provided to measure the applied voltage.

The barrel reactors 100, 200, 300, 700 being described further comprise a support 730 arranged to receive the one or more rollers 110, 120, 210, 710, 720. The support 730 may be arranged to allow the height and/or the spacing of the rollers 710, 720 to be adjusted, for example by two or more sections 730a, 730b of the support 730 being slidably mounted on a rail 732. The spacing may be adjusted to accommodate a larger or smaller barrel 702, to vary the field strength for a given barrel 702, and/or to bring the electrodes closer so as to cause plasma strike in a gas within the barrel 100, 200, 300. As would be understood by the skilled person, when the voltage exceeds a certain value called the striking voltage, the gas within the barrel ionises, becoming a plasma—this is referred to as the strike point. Heat can also be used to initiate plasma formation. The term "strike point" is therefore used to refer to the conditions required for a plasma to be formed—in the embodiments described herein, field intensity is controlled (for example by varying electrode voltage and/or spacing) to reach the strike point.

In some embodiments, the support 730 is arranged such that the longitudinal axis of the barrel 102, 202, 302, 702 is not horizontal, but rather is tilted at an angle to the horizontal. Advantageously, such positioning may change the mixing effect within the barrel reactor 100, 200, 300, 700. Additionally or alternatively, the support may be arranged to move so as to change the angle of the barrel 102, 202, 302, 702 during use. The skilled person would understand that embodiments in which the barrel 102, 202, 302, 702 is sloped instead of being horizontal may be particularly advantageous for applications such as the mixing of a powder with one or more non-conductive liquids.

In the embodiments being described, the support 730 also comprises a drive system 750 arranged to rotate the barrel 102, 202, 302, 702 either directly or using a belt, wheel or the like or one or more of the one or more rollers 110, 120, 210, 710, 720. The drive system 750 may also be configured to provide longitudinal motion and/or vibration of the rollers 110, 120, 210, 710, 720.

A drive system controller 750 is provided to control the speed and rotation direction of the or each roller 710, 720 arranged to be rotated by the drive system 750, and/or of the barrel 102, 202, 302, 702 by other means, such as a rotating axle.

In the embodiments being described, the drive system controller 750 is arranged to move the (or at least one) roller 110, 710 of the first electrode closer to the second electrode 120, 720 to facilitate reaching strike-point within the barrel reactor 100, 700 when the barrel reactor 100, 700 is first activated, before returning the first electrode roller 110, 710 to an operating position.

In the embodiments being described, a plurality of barrels 102, 202, 302, 702 may be provided with a single support 730. In this way, a barrel reactor 100, 200, 300, 700 may be supplied as a kit of parts with multiple barrels 102, 202, 702. The skilled person would understand that at least some embodiments of the invention facilitate exchange of barrels 102, 202, 302 for the same barrel reactor 100, 200, 300, 700. In particular, where roller electrodes 110, 210, 120 drive rotation of the barrel 100, 200, the barrel 102, 202 can simply be lifted off the rollers 110, 210, 120 and replaced with another barrel.

The skilled person will appreciate that different sizes and types of barrels 102 may be used with the same rollers 110, 210, 120, optionally with roller spacing being adjusted as appropriate. Further, different barrels 102, of the same or different types, may be used for different coating substrates/particles to be treated. Advantageously, this may avoid the risk of cross-contamination and/or allow for quicker changes of process, without requiring emptying or cleaning of the barrels 102.

Further, the skilled person will appreciate that having one or both of the electrodes 110, 120 outside of the barrel 102 also reduces the risk of contamination, as the different coating substrates/particles to be treated do not come into contact with the electrodes 110, 120. Cleaning of the electrodes between different uses is therefore not required.

In the embodiments being described, helium or a helium/oxygen mixture is used to create the plasma. Helium flow rates between 2 slm (standard litre per minute) and 10 slm and oxygen flow rates between 0 slm and 0.1 slm were used for the experiments described.

In embodiments wherein oxygen is not to be used as the main plasma constituent, air within the barrel 102, 702 generally needs to be purged before use. This may be done by exposing the barrel 102, 702 to vacuum or by flushing it with a different gas which can be used to form the plasma. The skilled person would understand that gases such as argon and helium are preferred in many embodiments as the required field intensity and voltage to form a plasma is lower than for oxygen. Advantageously, after using an initial flow rate of 10 slm of helium, for example, the flow rate may be dropped to less than 1 slm once the air has been substantially purged. In embodiments wherein the barrel 102, 702 can be sealed, the flow may be stopped altogether. Advantageously, this reduces gas usage, so reducing costs and wastage.

The barrel reactor 702 has been used to activate 20 g batches of silicone, polypropylene (PP), acrylonitrile butadiene styrene (ABS) and polyethylene terephthalate (PET) particles 740, with diameters in the range 3 to 5 mm. The skilled person would understand that other gases may be used and that different polymer substrates 740 and the likes, and different batch sizes and particle diameters, may be treated. For example, gases and gas mixtures suitable for use include He, $He/O_2$, $O_2$, Ar, $Ar/O_2$, Ar/He and $N_2$.

The skilled person would understand that the electrode arrangements disclosed herein facilitate scalability in that barrels of different sizes can be used with the same support 730 and electrode rollers 110, 120, 210, so permitting treatment of a wide variety of different batch sizes. Advantageously, the use of rollers as the electrodes 110, 120, 710, 720 may mean that access for exchanging barrels is not impeded.

Further, the skilled person would understand that the barrel reactor 100, 700 design is readily scalable by extending the length of the rollers and/or by increasing the diameter of the barrel 102, 702 for the treatment of large volumes of particles. In embodiments wherein the barrel diameter is increased, a larger number of electrode rollers 110, 120 and/or other electrode components may be used.

In alternative or additional embodiments, one or more magnets may be used to change the shape of the electromagnetic field. The one or more magnets may be inside or outside of the barrel 100, 700. One or more of the magnets may be a roller. In some embodiments, one or more of the magnets may be provide in the same electrode roller(s) as previously discussed. Advantageously, one or more magnets may be used to intensify the electromagnetic field in a particular area so as to induce plasma strike, and/or to help to avoid the presence of plasma around an inlet nozzle, as discussed above.

As outlined above, the electromagnetic field is affected by many different factors. The skilled person would therefore understand that the field shape and intensity within the barrel reactors 100, 700 discussed herein can be tailored to suit a particular application by varying any one or more of:
- electrode spacing;
- number of elements (e.g. electrode rollers 110, 120) forming each electrode;
- electrode arrangement;
- electrode size and shape;
- potential difference between the electrodes;
- use of one or more magnets;
- operating frequency;
- choice of electrode material (e.g. presence or absence of a dielectric sleeve); and
- choice of barrel 102 material, and barrel wall 102a thickness.

Experimental Testing

Figure 8A:
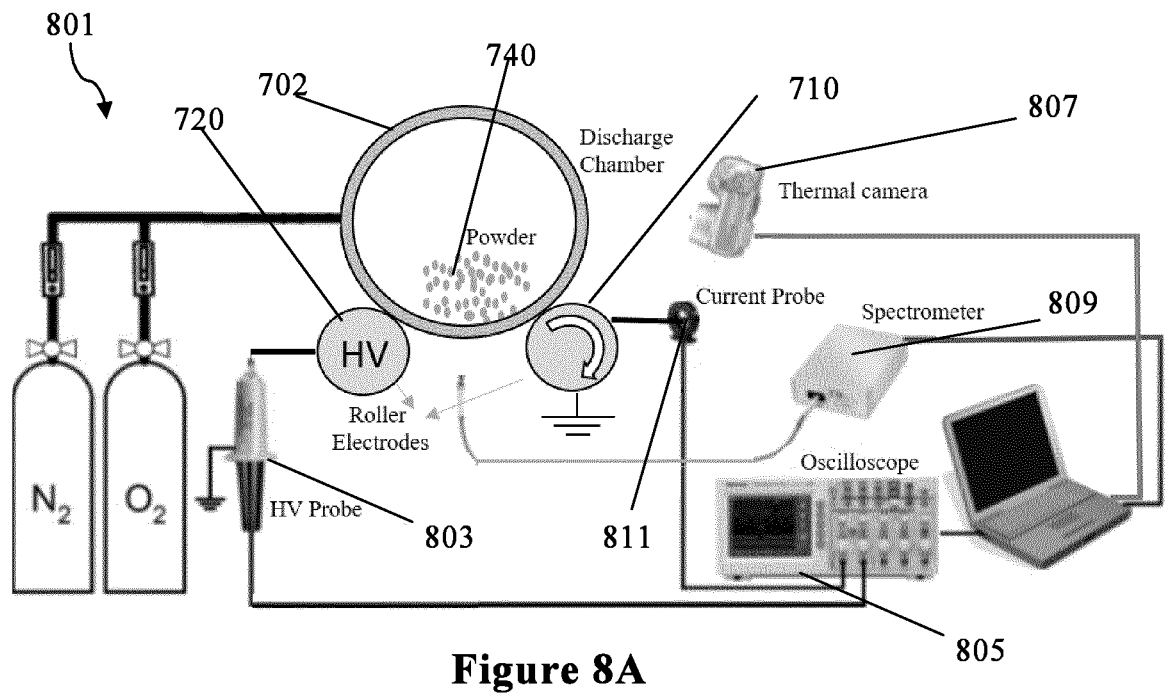
FIGS. 8a-8j show experimental testing of the barrel reactor of FIGS. 7a and 7b.

In tests undertaken, using the experimental set-up 801 shown in FIG. 8A, a quartz chamber 702 with dimension of 15 cm length and 10 cm inner diameter was used for the barrel 102. The chamber was sealed with two removable Teflon stoppers which were inserted 2.5 cm into the chamber, thus the effective treatment length was 10 cm. The plasma was operating at a frequency 20 kHz, an input voltage of up to 110 V with a maximum of 100 Watt output from the power supply (Plasma Technics Inc.). This equates to a 10 kV high voltage output. The powder charge 740 of 20 g was agitated by rotating of the chamber 702 with speed of approximately 6 rotations per minute. In this experimental set-up, the aluminium rods used to rotate the chamber 102, 702 also act as the biased and earthed electrodes 110, 120.

Helium and helium/oxygen gas mixtures were investigated as the process gases. Their flow rate was controlled using rotameters (Bronkhorst).

The experimental study undertaken investigated the performance of a barrel atmospheric plasma reactor 102, 702 of an embodiment of the invention for the activation of four types of polymer particles 740 (silicone, PP, ABS and PET) using a He plasma and $He/O_2$ plasma. The influence of processing parameters such as activation time, addition of oxygen to the helium plasma and helium flow rate on the level of plasma surface activation, based on water contact angle (WCA) measurements were investigated, as described below. The polymer water contact angles decreased from up to 140° to less than 10° after the plasma treatment (polymer dependent).

Overall, the barrel reactor 100, 700 showed highly reproducible plasma generation. Further process and power supply optimisation will allow treatment times and plasma qualities to be tailored.

The addition of oxygen into a helium discharge formed yielded a significant decrease in water contact angle of silicone polymer. Values of <5° were obtained after twenty minutes of plasma activation. Higher oxygen concentrations in the discharge (i.e. >0.1 slm $O_2$ in a 8-10 slm He plasma), lead to a partial quenching of the discharge. For PP, ABS and PET the large diminution of water contact angle at the first five minutes of activation and there are no significant effect observed with increasing activation time and gas flow rate.

Optical Emission Spectroscopy (OES) analysis demonstrated the increase in atomic species intensities with increased applied voltage and with a decrease in a helium flow rate. Intensity of the spectra increased near the barrel wall 102a and at the middle of the chamber 102 long its length. Thermal imaging analysis demonstrated the homogeneity of the plasma, which is thought to be due to the rotation of the chamber.

The heating effect of the plasma was monitored using an infrared thermographic camera 807, the maximum barrel temperature after 30 minutes treatment was found to be 27° C. The skilled person would appreciate that, in many embodiments, the temperature should be kept below 35° C. The aim is to avoid any thermal degradation of the polymer, so this temperature can be varied when different polymers are used.

Advantageously, rotation of the dielectric material of the barrel wall 102a into and out of the field may reduce the maximum temperature experienced by the dielectric as compared to prior art systems in which the dielectric material does not have time to relax during operation. Longevity of the system may thereby be improved.

An optical emission spectroscopy (OES) technique was used as a diagnostic tool to monitor the change in atomic and molecular species intensity, with changes in experimental conditions. Beside the helium emission lines, atomic emission lines of oxygen and molecular bands of OH, $N_2$ and $N_2^+$ were monitored. Electrical characterisation studies demonstrated an increase in plasma power with increasing input voltage and helium flow rate.

A number of different process monitoring techniques were mounted on the barrel reactor 100, 700. Optical emission spectra were obtained using an Ocean Optics USB4000 UV/VIS spectrometer 809 in the 200-850 nm region. This system 809 has a resolution of approx. 1.2 nm full width at half maximum (FWHM). The OES lens was positioned centrally underneath the chamber. Light from the plasma passes through a focusing lens and a 2 m-long 400 μm multi-mode fibre optic cable. The OES technique is based on the integration of measured signals over a line-of-sight observation. Optical spectra where collected every 20 seconds for total 3 minutes and an integration time of 2 seconds.

The plasma chamber 102, 702 temperature was measured using VarioCam high resolution infrared thermographic camera 807 with resolution of 640×480 pixels. Thermal measurements were taken after 30 minutes of plasma generation under a given processing condition. To provide an alternative method of temperature measurement of the discharge treated surface, thermocouple measurements (K-type) where performed on the plasma chamber wall 102a. The applied voltage was measured using a North Star PVM-5 high voltage probe 803 with a ratio of (1 V per kV), which was directly connected to the electrodes 110, 120. The current measurements were obtained with a Bergoz Instrumentation France, toroidal current transformer (CT-E5.0) 811 with an output of 5 V per Ampere. The current and voltage waveforms were monitored using a 4 channel digitizer (300 MHz bandwidth) Oscilloscope (Techtronix) 805. Herein, the RMS of the voltage and current waveforms over a time period of approximately 0.1 ms are used. This procedure yields an estimation of the average AC power, namely (P=IV) of the non-sinusoidal waveforms according to Equation 1:

$$V_{rms} \text{ (Volt)} \times I_{rms} \text{ (Ampere)} = P \text{(Watt)} \qquad \text{Equation 1}$$

The following polymer particles 740 were used in this study—Silicone Polyethylene terephthalate (PET), Polypropylene (PP) and Acrylonitrile butadiene styrene (ABS).

The silicone polymer particles 740 were manufactured from their resin (Wacker Elastosil). This involved firstly mixing the silicone rubber resin (LSR 3003/70) using the parts A & B liquid precursors. The resulting polymer was then formed into 5.0 mm diameter cylindrical filaments using a screw extrusion process. These filaments were then thermally cured at 155° C. The extruded filament was mechanically cut using an automated blade cutting system, to obtain the required cylindrical polymer particle size of 5.0 mm diameter and 0.5 mm thick. The manufacturing procedure is described in detail elsewhere (see, for example, H. M. Abourayana, J. N. Barry, P. Dobbyn, D. P. Dowling, Comparison between the Performance of Fluidized Bed and Barrel Rectors for the Plasma Activation of Polymer Particles, (2015) 57-64).

The PET was manufactured by Holfeld Plastics, Ireland and was cut into samples with dimensions of approximately 3×4×0.35 mm. The PP was manufactured from INEOS Olefins & Polymer Europe and the ABS granules were obtained from LG Chem; both had particle sizes of 3-4 mm.

The wettabilities of the polymer particles 740 were determined using a water contact angle equipment (Dataphysics Instruments OCA 20, sessile droplet technique). Measurements were obtained using deionized water droplets of volume of 0.5 μl at room temperature.

The results are divided into two sections. Firstly the results of the diagnostics study of the barrel reactor 102, 702 are presented, and then its effectiveness in the plasma activation of polymer particles 740 is assessed.

Electrical Characterisation

Electrical characterisation of the plasma using North Star high voltage and Bergoz Instrumentation current probes 811 connected to the digital oscilloscope 805 (Techtronix) showed the following data. Under the conditions selected 10 slm helium flow rate and 100 V operating voltage, the plasma was found to operate at a frequency of ~20 kHz and output voltage and current of 19.2 kV (peak to peak) and 20.6 mA respectively. The effect of input voltage on the plasma power was also investigated.

Figure 8B:
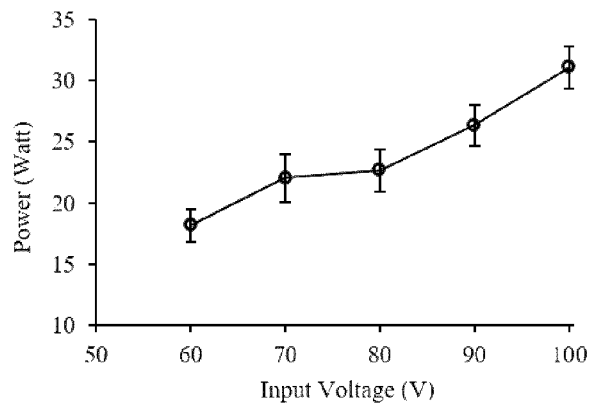

As shown in FIG. 8B, which is a line graph of power in Watts against input voltage (V), the power increased with increasing input voltage. The maximum power is 30 W at 100 V in the range tested.

Figure 8C:
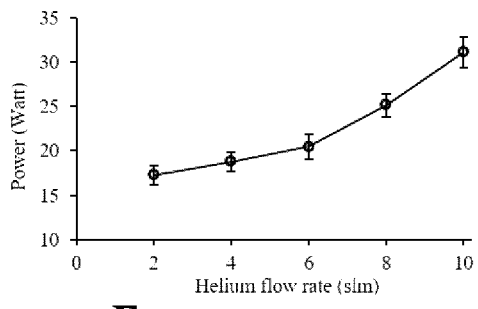
Figure 8D:
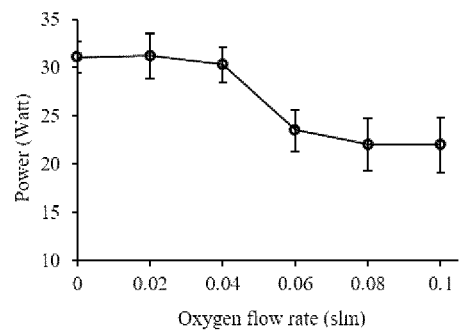

The effects of both helium flow rate and oxygen flow rate on the plasma power were also investigated. As shown in FIGS. 8c-8d, it was found that the plasma power increased with increasing helium flow rate and decreased with increasing of oxygen flow rate. A probable explanation for this is that, as the helium flow rate increases, the ionization and conductivity of the plasma also increase leading to an increase in the amount of discharge per unit volume and thus the current and discharge power. By contrast, increasing the oxygen flow rate leads to a decrease in the plasma power due to partial quenching (oxygen is an electronegative gas).

Optical Emission Spectroscopy (OES) and Thermal Measurements

Figure 8E:
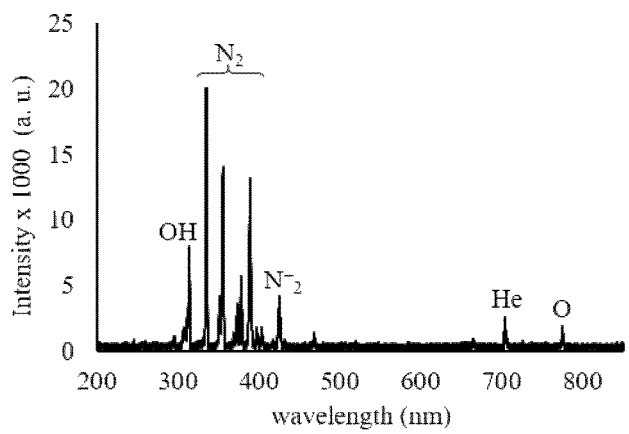
Figure 8F:
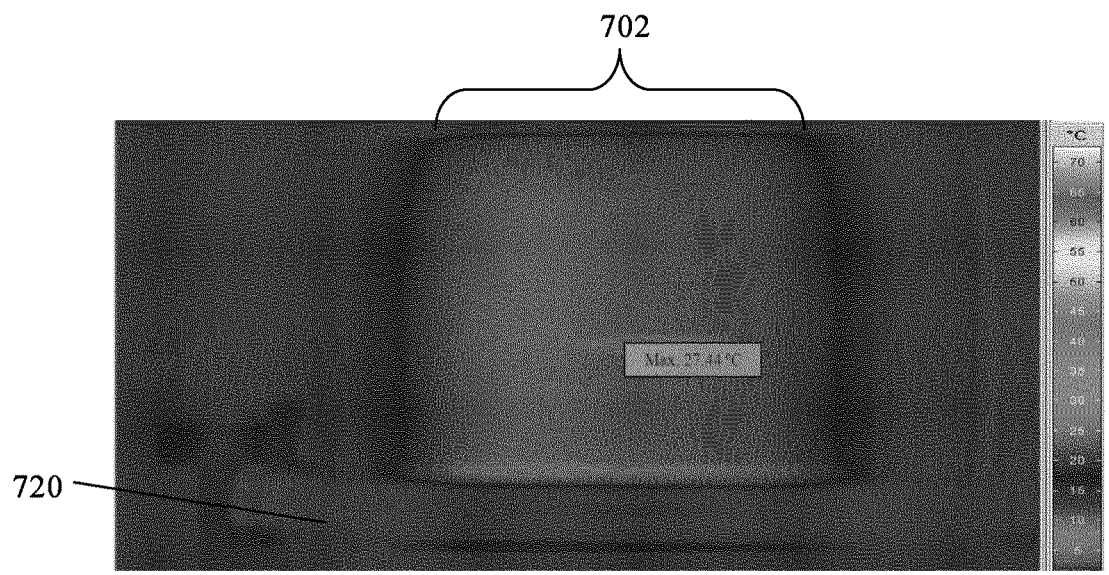
Figure 8G:
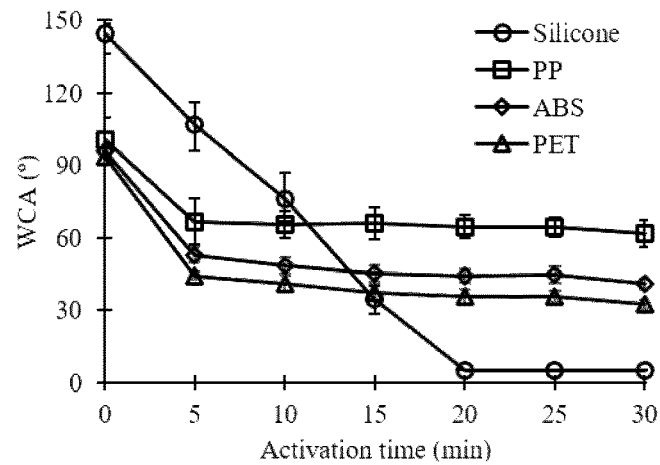
Figure 8H:
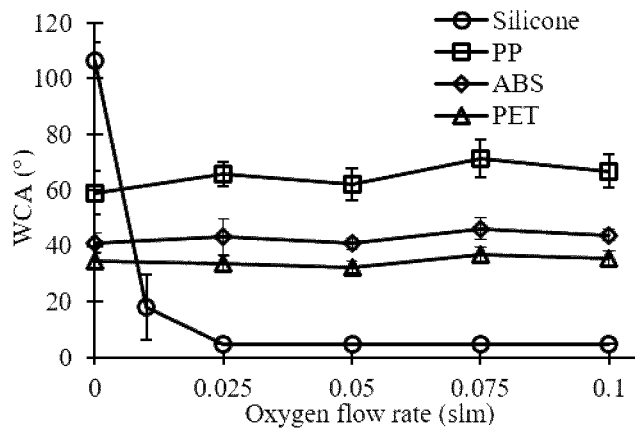
Figure 8I:
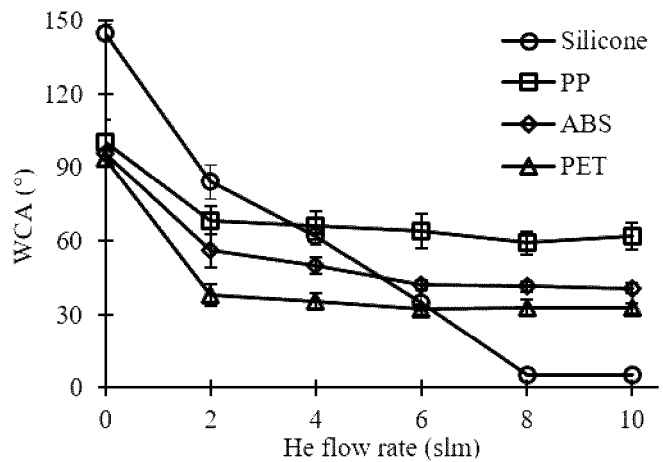
Figure 8J:
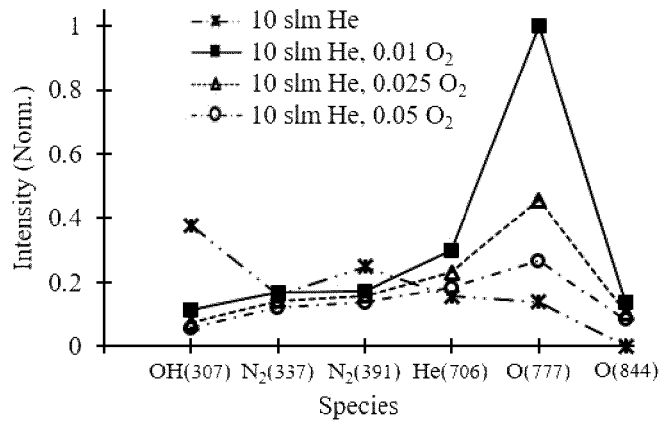

OES was utilized to investigate plasma species with varying helium and helium/oxygen flow rates and operating voltage. The emission spectrum of the plasma is shown in FIG. 8e.

The discharge spectra are dominated by excited atomic helium, molecular nitrogen and hydroxyl radicals. Emissions from excited $N_2^+$, O and H are also observed but at a lower intensity. The spectrum's composition presents similar atomic and molecular spectral emissions to those previously reported. The atomic helium spectral emission lines, atomic emission lines of oxygen and molecular bands of hydroxyl (OH), Nitrogen ($N_2$) and $N_2^+$ are presented in the radiation spectrum. For the pure helium discharge, the observation of emissions from OH, $N_2$ and $N_2^+$ is induced mainly by the air impurities which enter the helium gas stream from any ambient air which remains in the system.

At wavelengths both below and around 400 nm the emission of the second positive system of molecular nitrogen $N_2$ $[C^3\Pi^+u$-$B^3\Pi^+g]$ is observed (see, for example, C. E. Nwankire, V. J. Law, A. Nindrayog, B. Twomey, K. Niemi, V. Milosavljević, et al., Electrical, thermal and optical diagnostics of an atmospheric Plasma jet system, Plasma Chem. Plasma Process. 30 (2010) 537-552. doi:10.1007/s11090-010-9236-5).

The corresponding vibrational band heads, v=0→0, 1, 2 are located at the wavelengths, λ=337, 358 and 380 and 406 nm, respectively. At λ=391 nm the v=0→0 band of the first negative system of molecular nitrogen ions $N_2^+[B^2\Sigma^+u$-$X^2\Sigma^+g]$ is observed.

Two lines from atomic species are found in the near-infrared region: He $[3s^3S^1$-$2p^3P^0]$ at 706 nm and O $[3p^5P$-$3s^5S]$ at 777 nm. While in the UV emission band, OH radicals OH$[A^2\Sigma$+-$X^2\Pi]$ around 307 nm are found as well as the γ-bands of nitrogen oxide NO $[A^2\Sigma u$-$X^2\Pi]$ below 300 nm (see, for example, V. Milosavljevi, M. Donegan, P. J. Cullen, D. P. Dowling, Diagnostics of an O 2-He RF Atmospheric Plasma Discharge by Spectral Emission, 014501 (2014) 1-8. doi:10.7566/JPSJ.83.014501).

The effects of the applied voltage and gas flow rate on the intensity of the plasma species were also investigated.

In order to provide an indication of the relative sensitivity of specific species to plasma processing conditions, the areas under a number of the OES peaks were integrated. Six wavelengths were selected for this investigation 307 nm, 337 nm, 391 nm, 706 nm, 777 nm and 844 nm. Note that the 844 nm peak only appears with $O_2$ addition into the plasma. It was found that the total spectral intensity increased with increasing voltage and with a decrease in helium flow rate. The most homogeneous plasma was formed using 100 V input voltage and a Helium flow rate of 10 slm. It was observed that increasing the oxygen flow rate lead to a decrease in the intensity of the oxygen peak at 777 nm and also the decrease of the intensities of the other recorded peaks, due to non-radiative energy transfer among active species. FIG. 8$j$ shows the effect of oxygen flow rate on the intensities of plasma species. In this figure, the ratios are calculated using the intensity of the O line at 777 nm as the denominator.

Figure 6A:
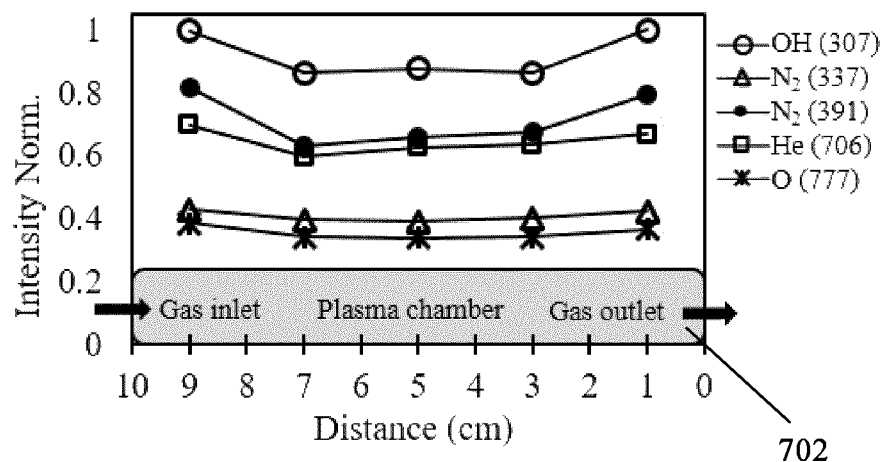
FIGS. 6a and 6b show axial and radial spectral emissions, respectively, for the five selected emitters studied using a barrel reactor as shown in FIGS. 7a and 7b.
Figure 6B:
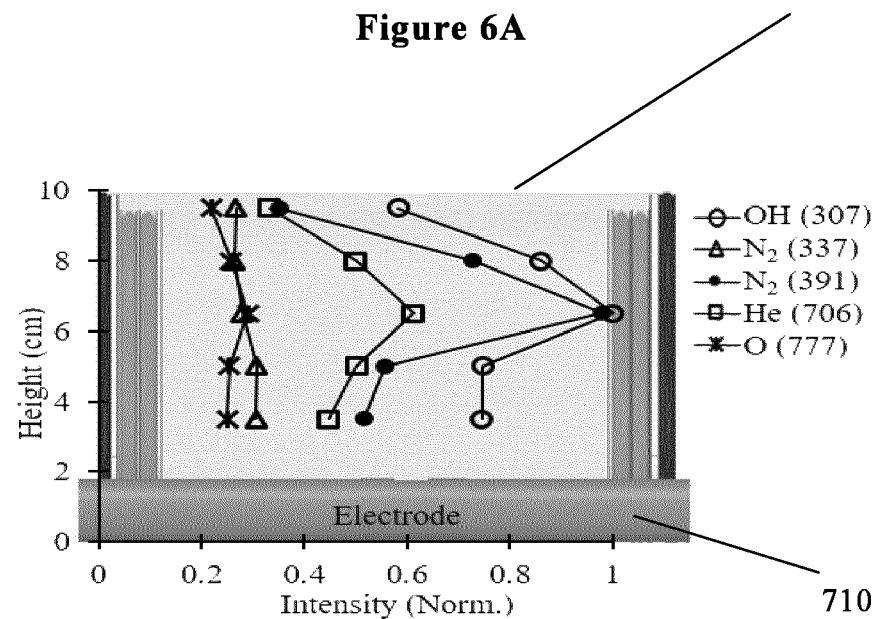
Figure 7A:
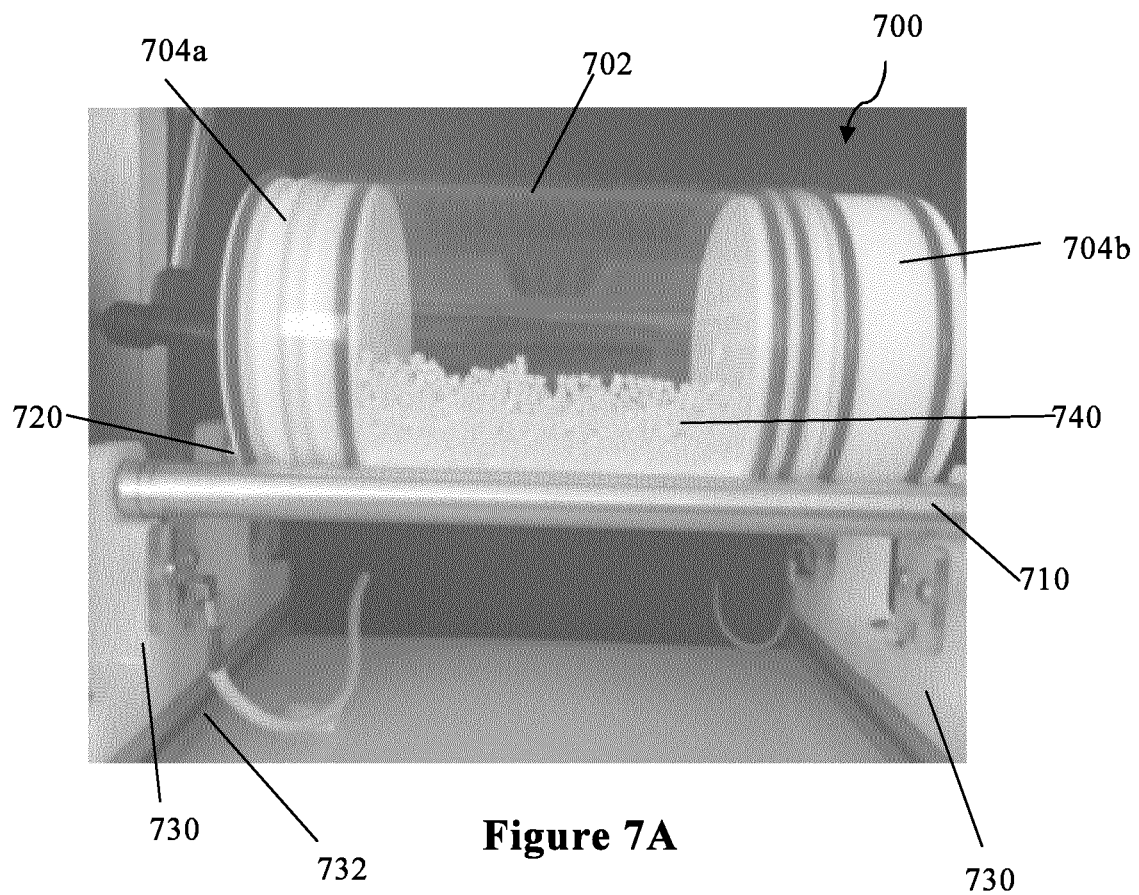
FIGS. 7a and 7b show photographs of a barrel reactor according to the invention.
Figure 7B:
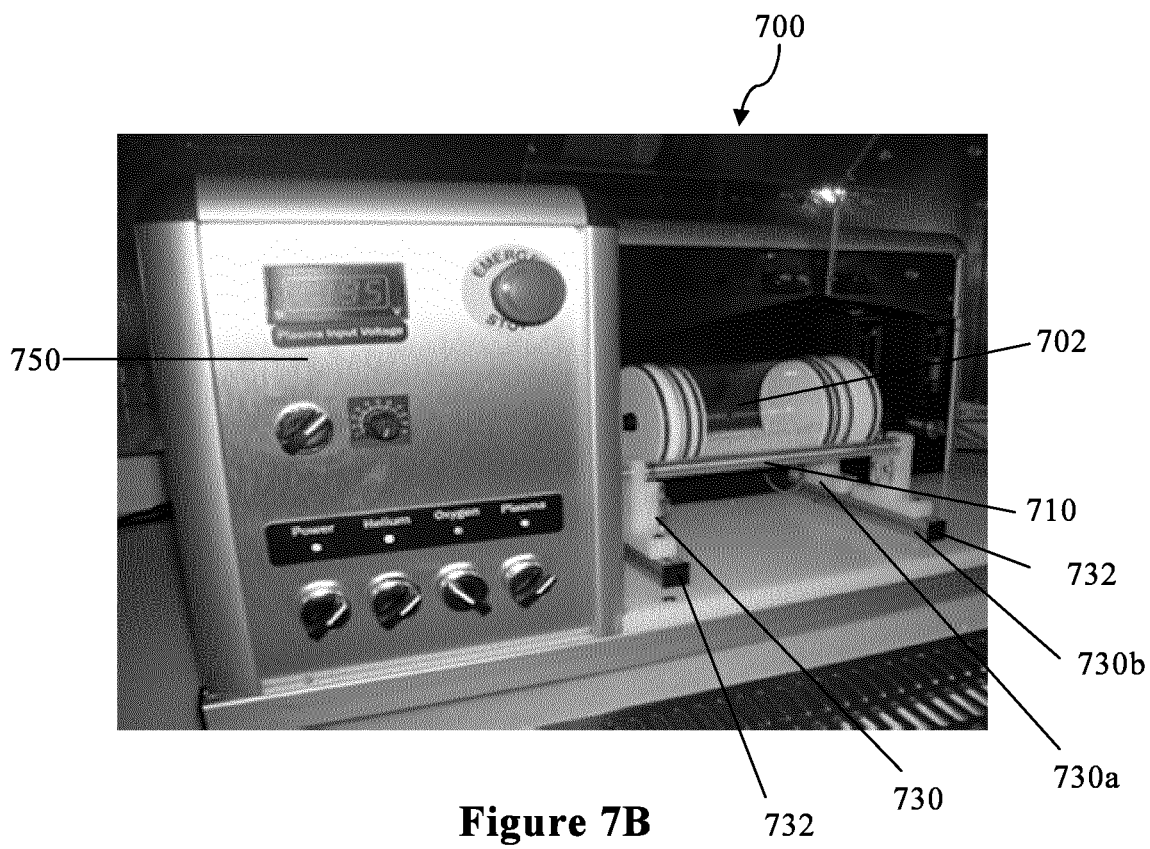

In order to gain an insight into plasma homogeneity, OES spectra were taken axially and radially. FIGS. 6$a$ and 6$b$ show axial and radial spectral emissions for the five emitters deemed to be the most important in this experiment. Intensity is measured in arbitrary units (a.u.).

The experimental conditions used to obtain the OES data presented in FIGS. 6$a$ and 6$b$ are a helium flow rate of 10 slm and voltage of 100 V. The O 777 and $N_2$ 337 spectral emissions show good homogeneity in the radial and axial directions across the barrel plasma. Both of these emitters are impurities in this experiment, i.e. the oxygen and nitrogen come from trapped ambient air, and therefore they have a very low intensity as the concentration is low. Helium metastable atoms are very important for the creation of the $N_2$ 391 emission, since the threshold for this process is over 18 eV. Therefore $N_2^+$ emission follows the same optical pattern as the He 706 emission. There is a similar situation with the OH spectral emission. The OH radicals could be produced through $H_2O$ dissociation and/or produced in the isothermal flow plasma jet by the reaction $H+NO_2 \rightarrow NO+OH$, where the H atoms are formed by the plasma discharge of highly humid ambient air and helium mixtures. The second mechanism is less likely in the experimental conditions used, since the barrel keeps the ambient air in a confined space and the high helium concertation limits the importance of the $NO_x$ species. Since the dissociation of molecules ($H_2O$) is most likely described by the gas kinetic temperature, the radical OH can be used as an indication of temperature in an ambient gas plasma discharge. From this study as shown in FIGS. 6$a$ and 6$b$, the maximum intensity of OH occurs at the middle of the barrel.

Thermal imaging analysis was carried out using an Infra Tec Vari CAM high-resolution infrared thermographic camera 807 (He flow rate 10 slm and 100 V input voltage). The plasma was ignited and the change in temperature of the chamber 102, 702 was recorded. The maximum temperature after 30 minutes monitored was 27° C. The external temperature was confirmed using both infrared thermometer with laser pointer (accuracy ±2° C.) and K-type thermocouple. FIG. 8$f$ shows the thermographic imaging of the plasma chamber 102, 702—the homogeneity of the temperature generated by the plasma is due to the rotation of the chamber 102, 702.

Water Contact Angle Measurements

FIG. 8$g$ shows the effect of He/$O_2$ plasma treatment time (activation time) on the water contact angle of silicone, PP, ABS and PET 740 (He flow rate 10 slm, $O_2$ flow rate 0.05 slm and input voltage 100 V). The behaviour of the silicone is somewhat different from that observed for the other polymers. The different properties of silicone are due to the Si—O bond, which has a higher bond energy than the C—O bond. Note that for water contact angles of <5° no error bars are included, as it is not possible to obtain accurate angle measurements using the selected equipment.

The effect of oxygen flow rate on the He plasma was also investigated. FIG. 8$h$ shows the effect of oxygen flow rate on the water contact angle of the different polymer particles 740 (treatment time 30 min, He flow rate 10 slm and operating voltage 100 V).

Its increase had a pronounced effect on the contact angle of the silicone polymer, but less so in the case of PP, ABS and PET. This lack of impact of oxygen addition particularly at higher concentrations may be associated with the partial quenching of the discharge with the addition of higher levels of oxygen and thus decreasing its ability to activate the polymer particles (see, for example, M. Donegan, V. Milosavljević, D. P. Dowling, Activation of PET Using an RF Atmospheric Plasma System, Plasma Chem. Plasma Process. 33 (2013) 941-957. doi:10.1007/s11090-013-9474-4).

The effect of helium gas flow rate was also investigated. FIG. 8$i$ shows the effect of helium flow rate on the water contact angle of the different polymer particles 740 (treatment time 30 min, Oxygen flow rate 0.05 slm and operating voltage 100 V).

For the silicone polymer it was found that the water contact angle decreased to less than 5° with increasing helium flow rate to 8 slm. For PP, ABS, and PET it was found that there are no significant effect of helium flow rate on water contact angle of these polymers (FIG. 8$i$).

For the silicone polymer 740, the relatively high polymer contact angles obtained after helium only plasma treatments, reflect the fact that abstraction of hydrogen atoms is not followed by O grafting, the most probable mechanism of surface modification being reported to involve an increase in the surface concentration of polar groups, i.e. replacement of methyl groups by a silica layer. For PET and PP 740, the large reduction in water contact angle is mainly due to the formation of oxygen-containing functionalities, such as C—O, O—C═O for PET and C—O, O—C═O, C═O and COOH for PP. While for ABS 740, increase in the wettability due to the creation of C—O, C—OH and R—COO— polar groups.

The invention claimed is:

1. A barrel reactor comprising:
a rotatable barrel comprising non-conductive material;
one or more rollers arranged to facilitate rotation of the barrel, wherein the one or more rollers comprises:
a first roller located outside of the barrel, wherein the first roller comprises at least part of a first electrode; and
a second electrode.

2. The barrel reactor according to claim 1, wherein the one or more rollers comprises a second roller.

3. The barrel reactor according to claim 2 wherein the rotatable barrel is mounted on the first and second rollers.

4. The barrel reactor according to claim 3 wherein a spacing between the first and second rollers is adjustable so as to accommodate rotatable barrels of different sizes, and/or wherein a vertical offset between the first and second rollers is adjustable.

5. The barrel reactor according to claim 2 wherein the second roller is at least one of within the barrel.

6. The barrel reactor according to claim 1 wherein the one or more rollers is rotated by the barrel, or arranged to cause rotation of the barrel.

7. The barrel reactor according to claim 1 wherein the second electrode is arranged not to rotate.

8. The barrel reactor according to claim 1 wherein one of the one or more rollers is at least substantially parallel to the barrel.

9. The barrel reactor according to claim 1 wherein the barrel has a barrel wall and wherein the one or more rollers is in contact with the barrel wall.

10. The barrel reactor according to claim 9 wherein the one or more rollers in contact with the barrel wall is arranged to cause rotation of the barrel using the contact between the barrel wall and the one or more rollers.

11. The barrel reactor according to claim 9 wherein an outer surface of the barrel wall and/or a surface of the one or more rollers which are in contact with the barrel wall is textured so as to provide grip between the barrel wall and the one or more rollers, and/or wherein the barrel and/or the one or more rollers is provided with one or more O-rings arranged to provide grip between the barrel wall and the one or more rollers.

12. The barrel reactor of claim 1 wherein, an electromagnetic field is generated between the first and second electrodes, and wherein further, when the barrel rotates, a barrel wall of the barrel is arranged to move through regions of the electromagnetic field of different strengths; and/or wherein the first and second electrodes are arranged such that an electromagnetic field generated thereby is not evenly distributed across the barrel.

13. The barrel reactor of claim 1 wherein the one or more rollers are located at a lower portion of the barrel reactor, such that the one or more rollers are located at or below a horizontal plane bisecting the barrel.

14. The barrel reactor of claim 13, wherein the one or more rollers is arranged to cause rotation of the barrel using a contact between a barrel wall of the barrel and said one or more rollers, and wherein all of the one or more rollers are within a predetermined angular spacing of a lowest point of the barrel wall, the angular spacing being measured around the barrel's circumference.

15. The barrel reactor according to claim 1 wherein the first and second electrodes are arranged, in use, to generate an electromagnetic field within at least a part of the barrel.

16. The barrel reactor according to claim 1 wherein the first and second electrodes are arranged, in use, to generate an inhomogeneous electromagnetic field within at least a part of the barrel, such that the inhomogeneous electromagnetic field is either (i) only sufficient to generate plasma in a portion of the barrel (ii) only sufficient to generate plasma in a lower portion of the barrel.

17. The barrel reactor according to claim 1 further comprising:
an inlet arranged to allow material to enter the barrel reactor, wherein the inlet is positioned in a portion of the barrel that is arranged not to contain plasma,
wherein the barrel comprises a dielectric material, and
wherein the first and second electrodes are arranged so as to allow at least a portion of the dielectric material to relax as the barrel rotates.

18. The barrel reactor according to claim 1, wherein the first roller comprises a dielectric coating.

19. A plasma barrel reactor, comprising:
a rotatable barrel comprising non-conductive material;
a first roller located outside of the barrel and arranged to facilitate rotation of the barrel, wherein the roller comprises at least part of a first electrode; and
a second electrode;
wherein the first and second electrodes are arranged, in use, to generate plasma within at least a part of the barrel.

20. A barrel reactor, comprising:
a rotatable barrel configured to receive material to be treated, the rotatable barrel comprising non-conductive material;
a first roller located outside of the barrel and arranged to facilitate rotation of the barrel, wherein the roller comprises at least part of a first electrode; and
a second electrode;
wherein the first and second electrodes are arranged, in use, to generate an electromagnetic field within at least a part of the barrel to treat material within the barrel.

* * * * *